DRIVEN-BOUNDARY PIEZOELECTRIC CRYSTALS

Filed Sept. 13, 1966

INVENTOR,
DON R. PARDUE

BY Harry M. Saragovitz,
Edward J. Kelly, Herbert Berl &
J. P. Edgerton
ATTORNEYS

United States Patent Office 3,465,178

Patented Sept. 2, 1969

3,465,178

DRIVEN-BOUNDARY PIEZOELECTRIC CRYSTALS

Don R. Pardue, Rockville, Md., assignor to the United States of America as represented by the Secretary of the Army Filed Sept. 13, 1966, Ser. No. 579,803
Int. Cl. H02k *49/00, 7/10;* H02p *15/00*
U.S. Cl. 310—9.7 2 Claims

ABSTRACT OF THE DISCLOSURE

A supplementary electrode in addition to the usual exciting electrodes is placed on a piezoelectric crystal to drive the boundary of unexcited material. This, in effect, produces essentially a one dimensional motion throughout the crystal.

Figure 1A:
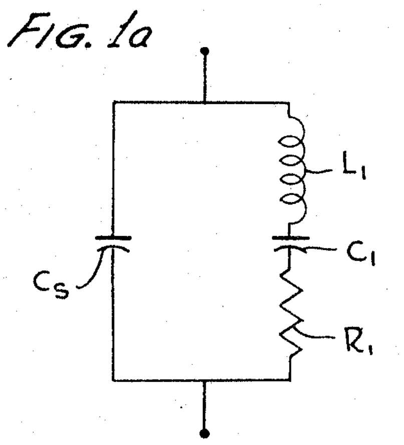

The invention described herein may be used by or for the government of the United States for governmental purposes without the payment to me of any royalty thereon.

This invention relates to piezoelectric crystals, and, in particular, piezoelectric crystal elements used in frequency control or filter network applications.

Piezoelectric crystal elements have long been used to provide a high degree of frequency stability, frequently over long periods of time, by replacing, for example, the resonant circuit of an oscillator with a mechanically vibrating piezoelectric quartz crystal, and thereby establishing a connection between the electrical circuit and the mechanical vibrations of the crystal by utilizing the piezoelectric effect. Many attempts have been made over the years in an effort to improve the performance of piezoelectric crystal devices. These improvements have been in the following areas: (1) utilizing different resonant frequencies, (2) improving dimensional tolerances, (3) improving ageing characteristics, or (4) changing the configuration of the crystal holder.

Notwithstanding such improvements, certain objectionable features. remain. The prior art piezoelectric crystal devices must generally be placed in a fragile mount in order to ensure a high Q factor. Piezoelectric crystal devices are typically mounted between two or more electrode plates using a number of schemes, and in general the electrodes are plated directly on the crystal faces. It is a characteristic of the prior art crystal devices that there is an excited area between the electrodes surrounded by unexcited material or a boundary which absorbs energy and represents a discontinuity in the crystal motion. Even in the case where the entire crystal surface is plated and excited, there will be discontinuities at the edges which will cause multiple modes and the resulting losses. This same effect results in inaccuracies in the theoretical analysis of crystal devices. In the analysis of crystals, one-dimensional motion is generally assumed, but never achieved. In actual operation spurious modes are present on vibrating crystals; and these are the most probable causes of spurious responses, in addition to the slight changes in resonant frequency that occur when small diameter crystals are being used, and the diameter-to-thickness ratio is decreased.

It is, therefore, an object of this invention to provide a piezoelectric crystal with greatly improved performance characteristics.

Another object is to provide a piezoelectric crystal which may be mounted to withstand shock and vibration, for example by potting, while maintaining the characteristic high Q factor or even making possible higher Q's.

It is still another object of this invention to provide piezoelectric crystals that are free from boundary effects and that therefore conform to the one dimensional analysis that is generally used, in effect becoming an infinite plate.

A further object is to provide piezoelectric crystals that are free from spurious modes thereby eliminating spurious responses and changes in resonant frequency.

An additional object is to provide piezoelectric crystals having higher Q's and in which the impedance of the crystal is favorably changed at the operating point in order to allow better circuit designs.

The aforementioned and other objects are attained by employing a new and unique concept in crystal technology, driven boundary crystals. The problems in using the prior art devices, as hereinbefore discussed, are overcome by driving the boundary of unexcited material so that, in effect, it does not exist. This is accomplished by providing a supplementary electrode on one of the crystal faces which is driven by a voltage fed back from one of the other electrodes. Driving the boundaries in this manner will, in effect, produce essentially a one dimensional motion, reduce losses, and increase Q, if the feedback voltage applied to the third electrode is of the same phase and slightly smaller in magnitude than the voltage obtained from the other electrode.

FIGURE 1*a* is the equivalent circuit of one type of prior-art piezo-electric crystal device.

Figure 1B:
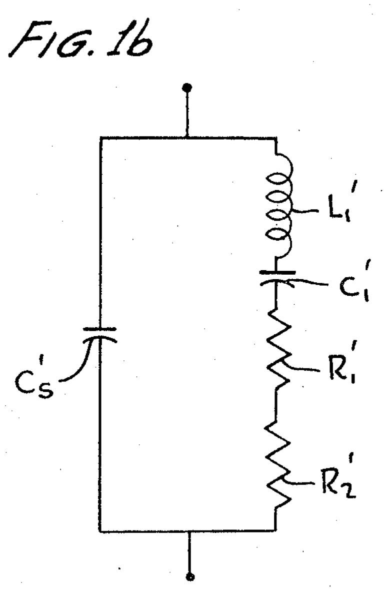

FIGURE 1*b* is the equivalent circuit of one embodiment of this invention.

Figure 2A:
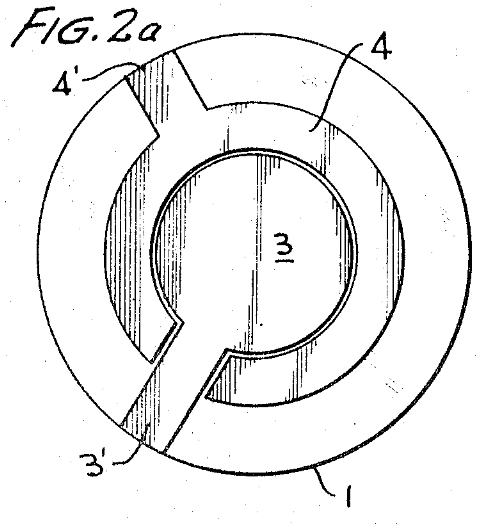

FIGURE 2*a* is a top view of the crystal and electrode configuration of a typical embodiment of this invention.

Figure 2B:
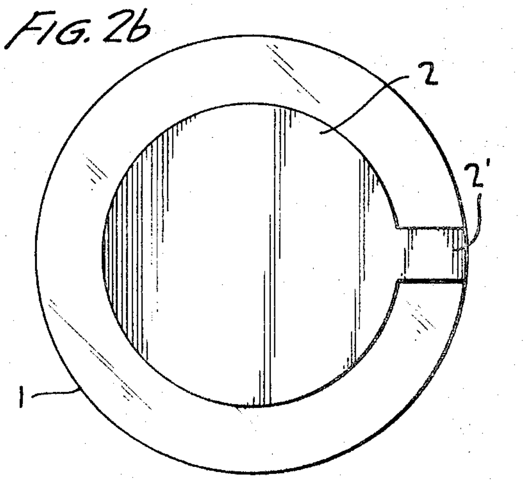

FIGURE 2*b* is a bottom view of the crystal and electrode configuration of the FIGURE 2*a*.

Figure 3:
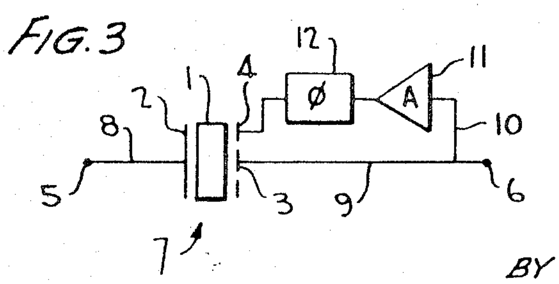

FIGURE 3 is a schematic diagram of one embodiment of the entire circuit necessary to obtain best results using this invention.

In FIGURE 1*a* the equivalent circuit shown is for a piezoelectric quartz crystal at or near resonance. Capacitor $C_s$ is the static capacitance or the parallel combination of the capacitance formed by the electrodes with the quartz dielectric and the shunt capacitance of the crystal holder. $L_1$, $C_1$, and $R_1$ represent the electrical equivalents of the vibrational characteristics of the crystal, in this case quartz. $L_1$ is the electrical equivalent of the crystal mass that is effective in the vibration, $C_1$ is the electrical equivalent of the effective mechanical compliance, and $R_1$ represents the losses caused by the absorption of energy into the unexcited boundary, friction, and other energy losses usual in a device of this type. Crystals of this nature normally exhibit two resonant frequencies of interest and numerous spurious responses due to the various modes of mechanical motion set up by an electrical driving force. One resonance occurs where the reactance of the series combination of $L_1$, $C_1$ and $R_1$ equals zero, and the other resonance occurs where the reactance of the series arm is equal in magnitude and opposite in phase to the reactance of $C_s$. The first resonant frequency is the series resonant frequency and is represented mathematically as follows:

$$f_S=1/2\pi\sqrt{L_1C_1}$$

The second resonant frequency is the parallel, or anti-resonant frequency represented as follows:

$$f_p=\frac{1}{2\pi\sqrt{1_{-1}\frac{C_1C_s}{C_1+C_s}}}$$

Either characteristic of the quartz crystal may be used, to determine the operating frequency depending on the circuit design being used. By usage the Q of a quartz crystal is defined to be the Q of the series arm as follows:

$$Q=2\pi f_S L_1/R_1=1/2\pi f_S C_1 R_1$$

In FIGURE 1*b* the circuit shown is an equivalent circuit of a quartz crystal in accordance with this invention. The elements $C_s'$, $L_1'$, $C_1'$ and $R_1'$ correspond to like elements in FIGURE 1*a*. The element $-R_2'$ is an equivalent generator introduced by the driven boundary as contemplated by my invention. The Q of this circuit is represented by the equation:

$$Q=\frac{2\pi f_s L'_1}{R_1'-R_2'}$$

Therefore by making $-R_2'$ assume a value close to that of $R_1'$ the Q of the quartz crystal may be significantly larger. It is important to note, however, that if $-R_2'$ should become larger than $R_1'$ the crystal would become unstable. Therefore, it is necessary to control the value of $-R_2'$ so that it remains slightly less than the value of $R_1'$.

FIGURES 2*a* and 2*b* show, in a typical embodiment, the electrode and crystal configuration utilized in this invention. It is important to note that the concept of this invention applies to all piezoelectric crystal types and cuts. The excited area of the crystal can have any size and shape, regular or irregular, consistent with its intended use. In the embodiment shown in these figures, quartz crystal 1 is a disk of the type used for high frequency thickness shear-mode operation. Plated thereon are the usual exciting electrodes 2 and 3 with tabs 2' and 3' for connection to the circuit in which the crystal is to be used. The voltage on electrode 3 is also connected through tab 3' to a feedback amplifier and phase shifter (shown in FIG. 3), and that voltage is then applied to a third, or boundary driving, electrode 4 through tab 4'. It is this voltage applied to electrode 4 that generates $-R_2'$ as discussed with reference to FIGURE 1*b*. While the size and shape of the electrodes are not important, it is important that the third or boundary driving electrode surround as closely and as much of the exciting electrode 3 as possible to achieve the best possible results. No significant errors will result if the gap between the exciting and the boundary driving electrode is irregular.

FIGURE 3 is a schematic diagram of the entire structure of a typical embodiment of this invention. Element 7 is a side view of the crystal and electrode configuration as described with reference to FIGURES 2*a* and 2*b*. Terminals 5 and 6 are connected, respectively, to exciting electrodes 2 and 3 by wires 8 and 9. Terminals 5 and 6 are connected to the circuit in which it is desired that the crystal be used in the same manner that an ordinary piezoelectric crystal would be connected to the circuit. The exciting voltage at exciting electrode 3 which is applied to terminal 6 is also picked off by lead 10 and applied through amplifier 11 and phase shifter 12 to boundary driving electrode 4. Amplifier 11 and phase shifter 12 are used to control the phase and magnitude of the voltage fed back to electrode 4. Stability of operations is critically dependent on the phase and magnitude of the voltage applied to electrode 4. This voltage must be of the same phase and slightly smaller magnitude than the exciting voltage appearing at exciting electrode 3. The results of applying such a voltage to electrode 4 will be the achievement of the objects as discussed above.

It will be apparent that the embodiments shown are only exemplary and that various modifications can be made in construction and arrangement within the scope of the invention as defined in the appended claims. In particular, this invention will apply to all crystal materials and cuts, the electrode configuration may be of any geometry consistent with its intended use, and any number of boundary driving or exciting electrodes may be used as necessary. The apparatus of this invention may be utilized in crystal filter applications and in any circuit where crystal frequency control is deemed desirable.

I claim as my invention:

1. An improved piezoelectric crystal device suitable for rugged mounting comprising:

(a) a piezoelectric crystal,
(b) parallel plate exciting electrodes placed adjacent opposite faces of the piezoelectric crystal,
(c) A supplementary electrode that substantially surrounds the perimeter of an exciting electrode and conforms to the geometry thereof,
(d) means for applying the voltage from one of said exciting electrodes to said supplementary electrode, and
(e) means for adjusting the magnitude and phase of said voltage so that said magnitude is slightly smaller than, and said phase is the same as, the voltage available at said exciting electrode.

2. The invention of claim 1 wherein said supplementary electrode means substantially surrounds one of said exciting electrode means.

References Cited

UNITED STATES PATENTS

| | | | |
|---|---|---|---|
| 1,990,822 | 2/1935 | Goldstine | 310—9.7 |
| 2,046,618 | 7/1936 | Finch | 310—9.7 |
| 2,223,537 | 12/1940 | Sykes | 310—9.7 |
| 2,510,811 | 6/1950 | Gale | 310—9.6 |
| 2,967,957 | 1/1961 | Massa | 310—8.5 |
| 2,969,512 | 1/1961 | Jaffe | 310—8.2 |
| 3,222,622 | 12/1965 | Curran | 310—8.1 |
| 3,307,052 | 2/1967 | Neilson | 310—8.5 |
| 3,374,367 | 3/1968 | Cowan | 310—8.5 |
| 2,262,966 | 11/1941 | Rohde | 310—9.8 |
| 2,956,184 | 10/1960 | Pollack | 310—8.2 |
| 2,943,279 | 6/1960 | Mattiat | 310—9.8 |
| 3,202,868 | 8/1965 | Blank | 310—8.1 |
| 3,243,648 | 3/1966 | Yando | 310—9.8 |
| 3,297,968 | 1/1967 | Fowler | 310—9.8 |
| 3,335,299 | 8/1967 | Yando | 310—9.8 |
| 3,396,327 | 8/1968 | Nakazawa | 310—9.8 |

J. D. MILLER, Primary Examiner

U.S. Cl. X.R.

310—8.5, 9.6